US009361199B2

(12) United States Patent
Ren et al.

(10) Patent No.: US 9,361,199 B2
(45) Date of Patent: Jun. 7, 2016

(54) PROTECTING VIRTUAL MACHINES AGAINST STORAGE CONNECTIVITY FAILURES

(71) Applicant: VMware, Inc., Palo Alto, CA (US)

(72) Inventors: Joanne Ren, Cupertino, CA (US); Igor Tarashansky, Concord, MA (US); Keith Farkas, San Carlos, CA (US); Elisha Ziskind, Sharon, MA (US); Manoj Krishnan, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 202 days.

(21) Appl. No.: 13/975,098

(22) Filed: Aug. 23, 2013

(65) Prior Publication Data

US 2014/0059392 A1 Feb. 27, 2014

Related U.S. Application Data

(60) Provisional application No. 61/693,149, filed on Aug. 24, 2012.

(51) Int. Cl.
*G06F 11/00* (2006.01)
*G06F 11/30* (2006.01)
*G06F 11/07* (2006.01)
*G06F 11/14* (2006.01)
*G06F 11/20* (2006.01)

(52) U.S. Cl.
CPC .......... *G06F 11/301* (2013.01); *G06F 11/0712* (2013.01); *G06F 11/0793* (2013.01); *G06F 11/1438* (2013.01); *G06F 11/1484* (2013.01); *G06F 11/202* (2013.01)

(58) Field of Classification Search
CPC .................................................... G06F 11/301
USPC ........................................ 714/47.1, 4.1, 4.21
See application file for complete search history.

(56) References Cited

U.S. PATENT DOCUMENTS

2009/0172471 A1* 7/2009 Zimmer et al. ................. 714/17
2010/0115332 A1* 5/2010 Zheng et al. ...................... 714/6
2011/0202795 A1* 8/2011 Marathe et al. ................. 714/23

* cited by examiner

*Primary Examiner* — Dieu-Minh Le

(57) ABSTRACT

A system for monitoring a virtual machine executed on a host. The system includes a processor that receives an indication that a failure caused a storage device to be inaccessible to the virtual machine, the inaccessible storage device impacting an ability of the virtual machine to provide service, and applies a remedy to restore access to the storage device based on a type of the failure.

17 Claims, 4 Drawing Sheets

PROTECTING VIRTUAL MACHINES AGAINST STORAGE CONNECTIVITY FAILURES

CROSS REFERENCE TO RELATED APPLICATIONS

This application claims benefit of earlier filed provisional application No. 61/693149 filed Aug. 24, 2012, and having the same title as the present application, which is hereby incorporated by reference in its entirety.

BACKGROUND

In a data center that utilizes virtualization, hardware failure is the cause of application downtime about twenty percent of the time, when compared to other failures, such as user error and software component failure. Further, at the enterprise level, hypervisor-based hosts are impacted by storage and network outages more than any other outage, including degradations of protection. As such, hardware failure is an area of concern for infrastructure/server/VI administrators when virtualizing.

In addition, the impact of a hardware failure (i.e. server or I/O connectivity loss) increases as the number of virtual machines and datastores per host increases. As such, hardware failure has a direct attributable negative impact of virtualizing. Thus, with higher consolidation ratios, failures impact more virtual machines and, as a result, customers stop consolidating, reduce the capital expenditure benefits of virtualizing, and/or keep their key applications on physical infrastructure to ensure they get the desired level of protection. Thus, due to the high visibility of infrastructure outage to a virtualized infrastructure and in order to raise customer confidence, it is important to be able to protect against hardware outages.

SUMMARY

The systems and methods described herein monitor a virtual machine executed on a host by receiving an indication that a failure caused a storage device to be inaccessible to the virtual machine, the inaccessible storage device impacting an ability of the virtual machine to provide service; and applying a remedy to restore access to the storage device based on a type of the failure.

DETAILED DESCRIPTION

Embodiments of the present disclosure provide a proactive approach to a detection of and reaction to hardware component failures that impact a virtual machine's ability to provide service. More specifically, the methods and systems described herein enable a host to detect storage access failures, such as Permanent Device Loss (PDL) failures and transient All Paths Down (APD) failures, and provide a heuristic approach to the automated recovery of impacted virtual machines.

In accordance with embodiments of the present disclosure, the term "host" refers to a computing device that executes one or more software application instances, such as a virtual machine, an instance of a server application (e.g., a web server or an application server), and/or an instance of a data processing application (e.g., a distributed computing client). The software application instances may be associated with (e.g., stored in) one or more storage devices (e.g., datastores), such that a software application instance may be migrated to or restarted at any host with access to the datastore that corresponds to the software application instance.

Figure 1:
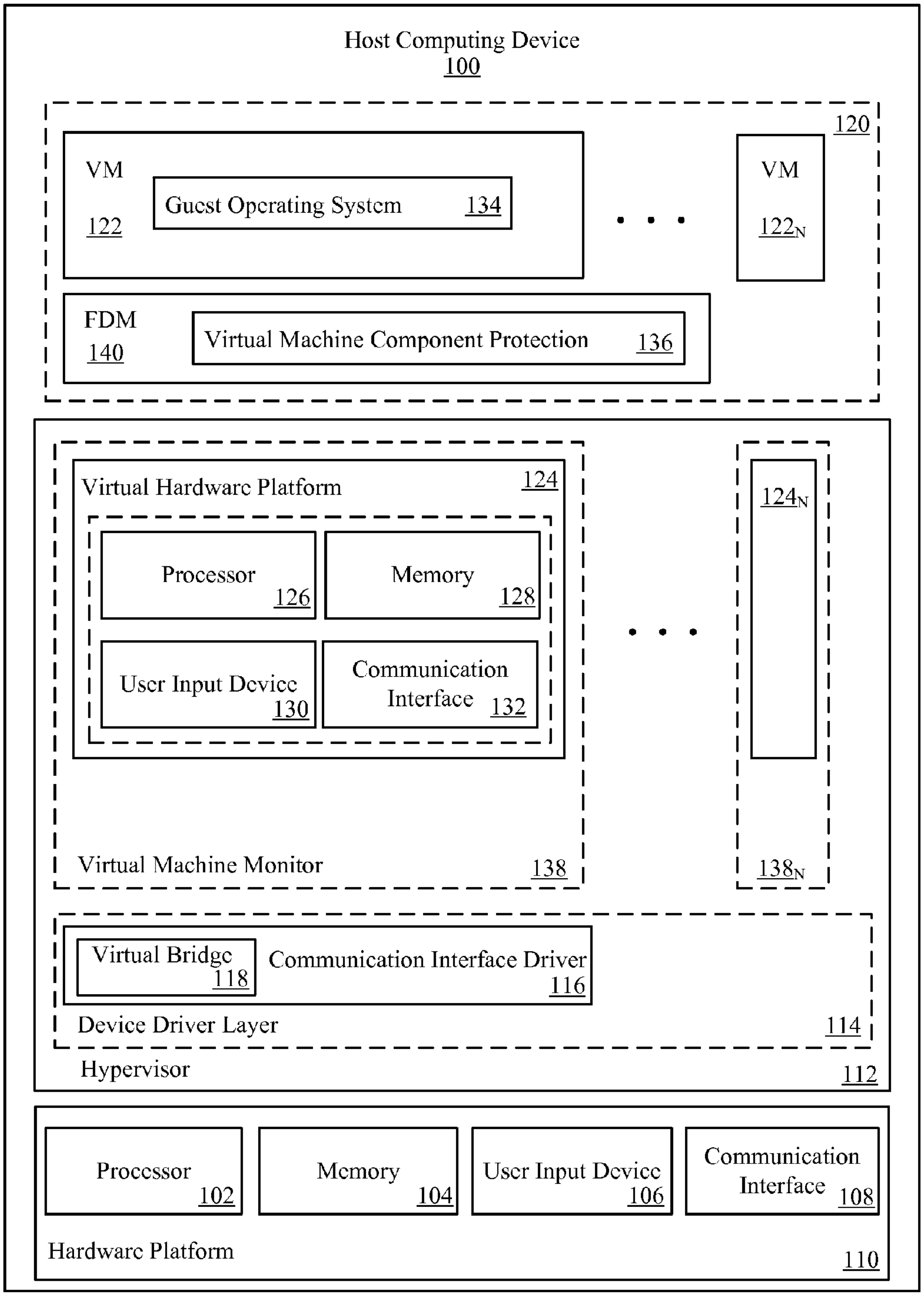
FIG. 1 is a block diagram of an exemplary host computing device in accordance with embodiments of the present disclosure.
Figure 3:
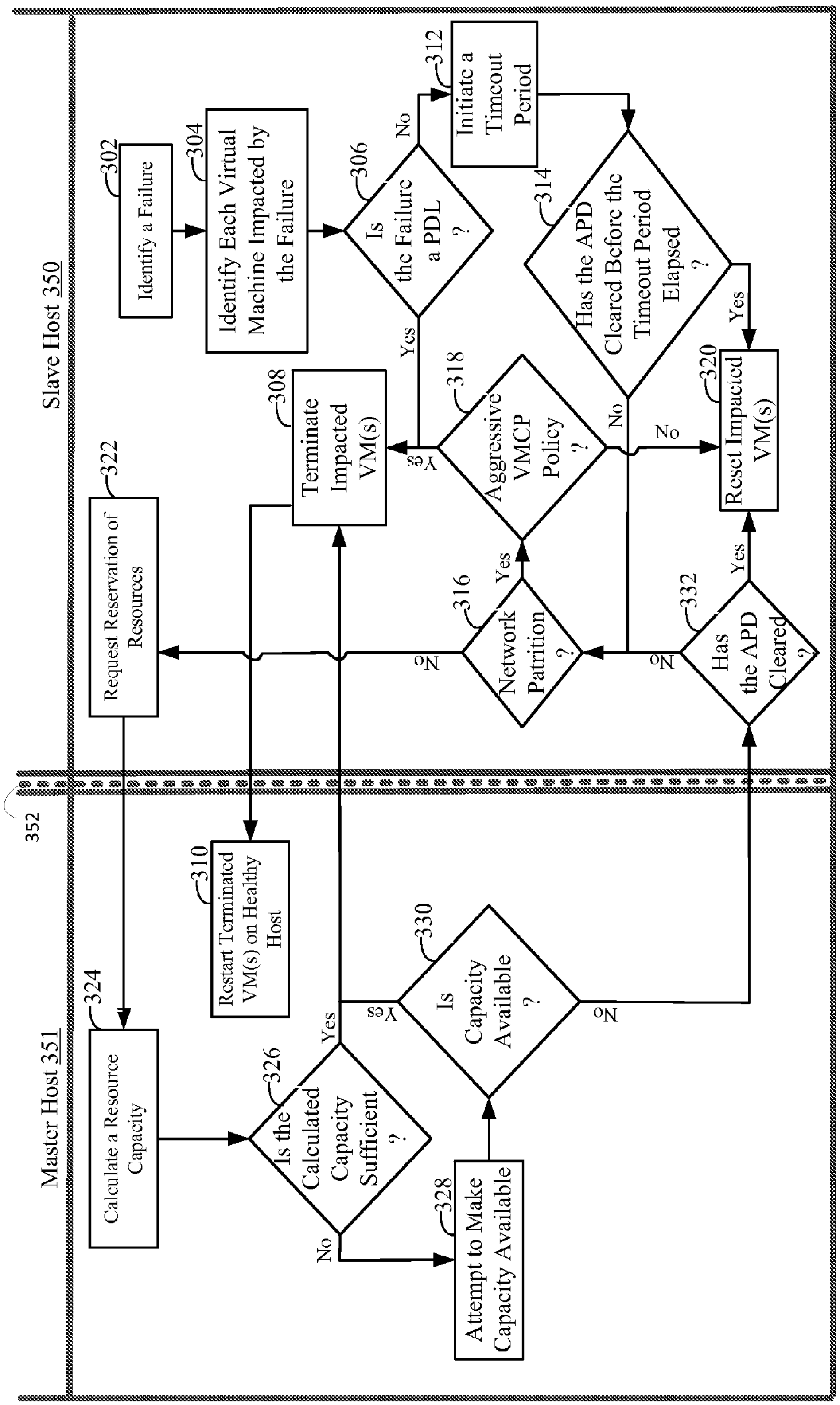
FIG. 3 is a swimlane diagram of an exemplary method for monitoring storage connectivity failures.
Figure 4:
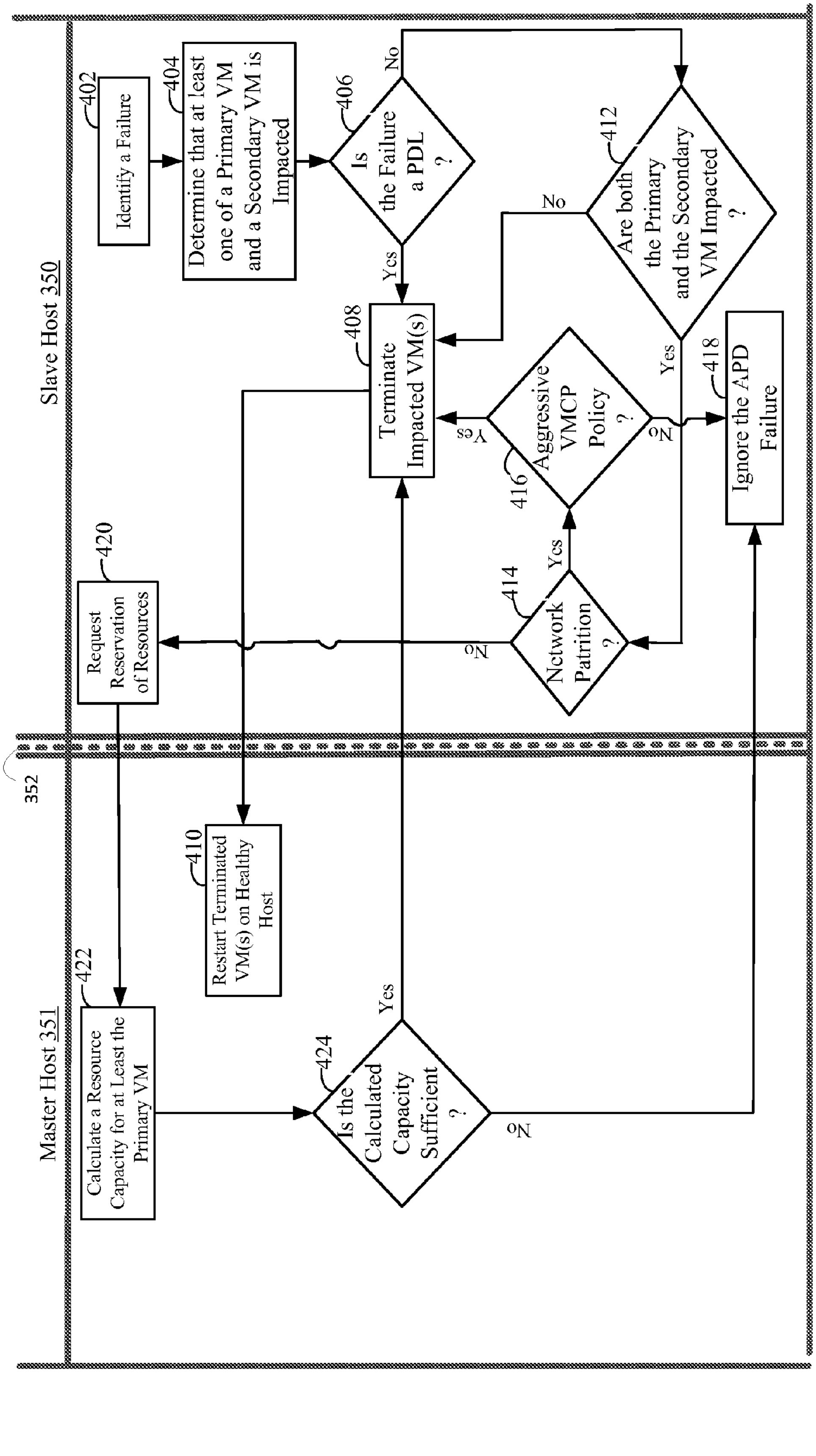
FIG. 4 is a swimlane diagram of an exemplary method for monitoring storage connectivity failures between paired virtual machines.

With reference now to FIG. 1, a block diagram of an exemplary host computing device 100 is provided. Host computing device 100 includes a processor 102, a memory 104, a user interface 106, and a communication interface 108. In embodiments, processor 102 is transformed into a special purpose processor by executing computer-executable instructions or by otherwise being programmed. For example, processor 102 is programmed with instructions such as illustrated in FIG. 3 and FIG. 4.

Memory 104 may be any device allowing information, such as executable instructions, suitability values, configuration options (e.g., predetermined durations for receiving transmissions), and/or other data, to be stored and retrieved. For example, memory 104 may include one or more random access memory (RAM) modules, flash memory modules, hard disks, solid state disks, and/or optical disks. In some embodiments, executable instructions for performing one or more of the operations described herein, for example, the operations shown in FIG. 3 and FIG. 4 are stored in memory 104. In one embodiment, memory 104 includes one or more computer-readable storage media that have computer-executable components embodied thereon.

User input device 106 enables input to be received from a user. For example, user input device 106 may be, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of a presentation device and user input device 106.

Communication interface 108, which enables host computing device 100 to communicate with a remote device (e.g., another host computing device 100) via a communication medium, such as a wired or wireless packet network. For example, host computing device 100 may transmit and/or receive messages (e.g., heartbeat messages and/or execution commands) via communication interface 108. Communication interface 108 also enables host computing device 100 to communicate with one or more storage devices (e.g., datastores). In exemplary embodiments, communication interface 108 couples host computing device 100 to a storage area network (SAN) (e.g., a Fibre Channel network) and/or to a network-attached storage (NAS) system (e.g., via a packet network).

Host computing device 100 includes a hardware platform 110, such as an x86 architecture platform. In embodiments, hardware platform 110 includes processor 102, memory 104, user input device 106, communication interface 108, and other input/output (I/O) devices, such as a presentation device (not shown) for presenting information to a user.

As shown in FIG. 1, a virtualization software layer, also referred to hereinafter as a hypervisor 112, is installed on top of hardware platform 110. The virtualization software layer supports a virtual machine execution space 120 within which multiple virtual machines (VMs 122-122$_N$) may be concurrently instantiated and executed. Hypervisor 112 includes a device driver layer 114, and maps physical resources of hardware platform 110 (e.g., processor 102, memory 104, user input device 106, and/or communication interface 108) to "virtual" resources of each of VMs 122-122$_N$ such that each of VMs 122-122$_N$ has its own virtual hardware platform (e.g., a corresponding one of virtual hardware platforms 124-124$_N$), with each virtual hardware platform having its own emulated hardware (such as a processor 126, a memory 128, a user input device 130, a communication interface 132, and other emulated I/O devices in VM 122).

In some embodiments, memory 128 in first virtual hardware platform 124 includes a virtual disk that is associated with or "mapped to" one or more virtual disk images stored in memory 104 (e.g., a hard disk or solid state disk) of host computing device 100. The virtual disk image represents a file system (e.g., a hierarchy of directories and files) used by first virtual machine 122 in a single file or in a plurality of files, each of which includes a portion of the file system. In addition, or alternatively, virtual disk images may be stored in memory 104 of one or more remote host computing devices 100, such as in a SAN configuration. In such embodiments, any quantity of virtual disk images may be stored by host computing device 100.

Device driver layer 114 includes, for example, a communication interface driver 116 that interacts with communication interface 108 to receive and transmit data from, for example, a local area network (LAN) connected to host computing device 100. Communication interface driver 116 also includes a virtual bridge 118 that simulates the broadcasting of data packets in a physical network received from one communication interface (e.g., communication interface 108) to other communication interfaces (e.g., the virtual communication interfaces of VMs 122-122$_N$). Each virtual communication interface for each of VMs 122-122$_N$, such as communication interface 132 for first VM 122, may be assigned a unique virtual Media Access Control (MAC) address that enables virtual bridge 118 to simulate the forwarding of incoming data packets from communication interface 108.

Virtual hardware platform 124 may function as an equivalent of a standard x86 hardware architecture such that any x86-compatible desktop operating system (e.g., Microsoft Windows™ brand operating system, Linux™ brand operating system, Solaris™ brand operating system, NetWare™, or FreeBSD™) may be installed as guest operating system (OS) 134 in order to execute applications for an instantiated virtual machine, such as VM 122. Virtual hardware platforms 124-124$_N$ may be considered to be part of virtual machine monitors (VMM) 138-138$_N$ which implement virtual system support to coordinate operations between hypervisor 112 and corresponding VMs 122-122$_N$.

One of ordinary skill in the art will appreciate that the various terms, layers, and categorizations used to describe the virtualization components in FIG. 1 may be referred to differently without departing from their functionality or the spirit or scope of the present disclosure. For example, virtual hardware platforms 124-124$_N$ may also be considered to be separate from VMMs 138-138$_N$, and VMMs 138-138$_N$ may be considered to be separate from hypervisor 112. One example of hypervisor 112 that may be used in an embodiment of the disclosure is included as a component ESX™ brand software, which is commercially available from VMware, Inc. of Palo Alto, Calif.

Figure 2:
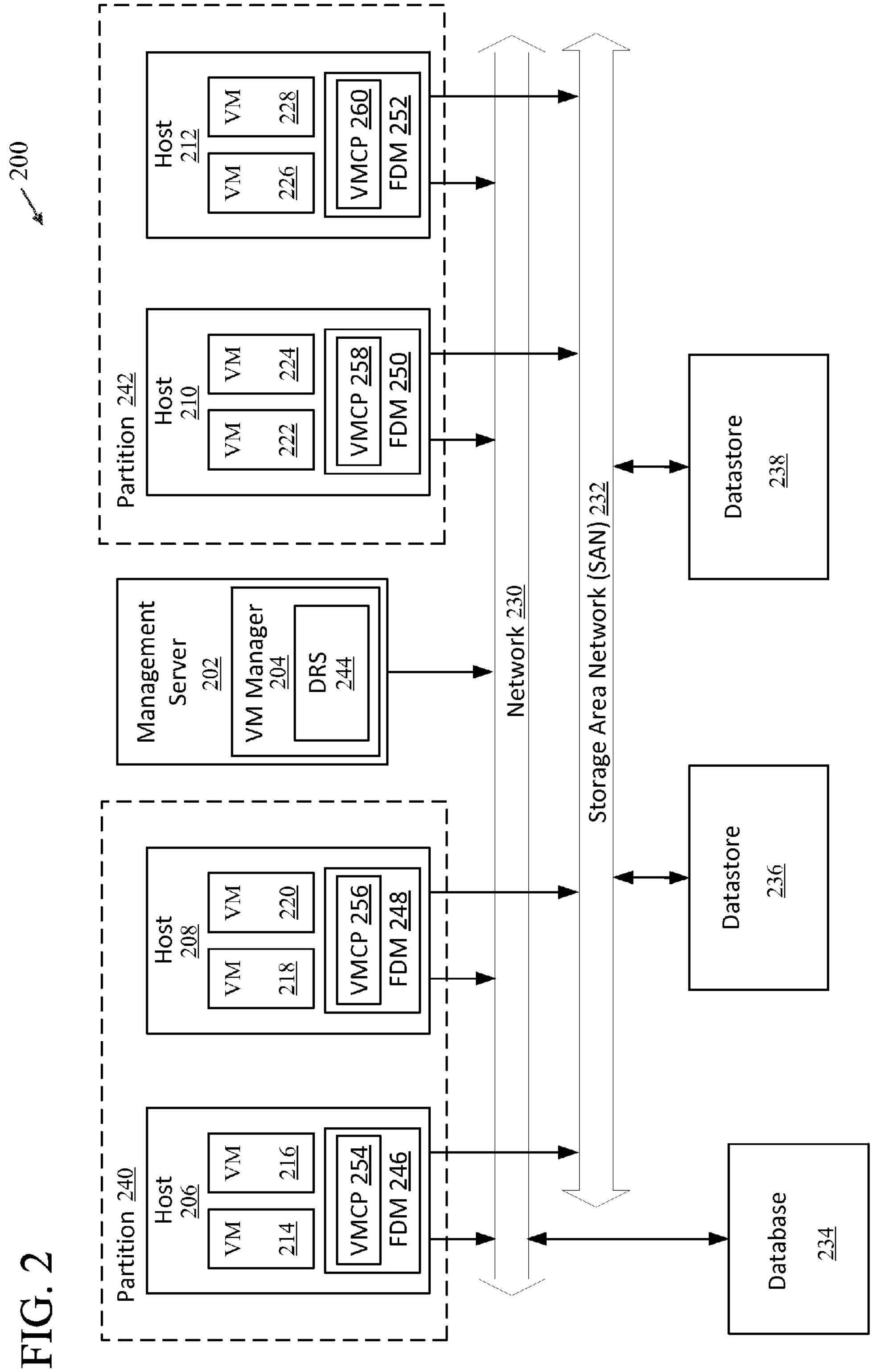
FIG. 2 is a block diagram of a system architecture in accordance with embodiments of the present disclosure.

With reference now to FIG. 2, a block diagram of a system architecture in accordance with one embodiment is provided. In at least some embodiments, system 200 implements a fully distributed workflow implemented by a local policy, such as VMCP 136 executed by FDM 140 shown in FIG. 1. Moreover, system 200 may implement an asynchronous communication with one or more master hosts as will be described below.

As shown in FIG. 2, system 200 includes virtual machine (VM) manager 204, which is software that executes on a management server 202 running an OS (e.g., Microsoft Windows™ brand operating system, Linux™ brand operating system). In one example embodiment, VM manager 204 is capable of managing a cluster of virtual machine hosts (e.g., 64 or more), such as hosts 206-212. In one embodiment, VM manager 204 is a VMware vCenter Server™ or a successor product sold by VMware, Inc. As shown in FIG. 2, VM manager 204 has access to a database 234, which might also run on management server 202, or could run in a separate database server (not shown). Although shown as a physical computer system, it will be appreciated that management server 202 might be implemented as a virtual machine that runs in one of hosts 206-212.

Management server 202 is connected to hosts 206-212 via network 230, which may be a LAN (local area network), WAN (wide area network), Internet, or the like, or a combination of different networks. Further, hosts 206-212 may communicate with one another via network 230 and/or storage area network (SAN) 232.

Hosts 206-212 execute one or more software application instances, such as VMs 214-228, which are associated with virtual disk images, configuration files, and/or other data stored in file systems provided by datastores 236 and 238. In one embodiment, hosts 206-212 are connected to datastores 236 and 238 via SAN 232. Datastores 236 and 238 may be stored in memory 104 (shown in FIG. 1) of one or more host computing devices 100 (shown in FIG. 1). For example, datastores 236 and 238 may be stored in an array of hard disk drives and/or solid state drives.

To coordinate the activity of hosts 206-212 and/or VMs 214-228, at least one of hosts 206-212 may operate as a master host, with a non-master host being referred to as a secondary host (e.g., a subordinate host or backup host). In exemplary embodiments, each of hosts 206-212 executes a fault domain manager (FDM) software application that includes executable instructions for selecting a master host. The FDM application also includes instructions for acting as a master host and for acting as a secondary host.

The methods described herein may be executed by each host 206-212, with each host 206-212 being capable of selecting a master host, acting as the master host, and acting as a secondary host, as appropriate. In some embodiments, hosts 206-212 may be isolated or "partitioned" in groups, such as a first group in first partition 240, such as a network partition, and a second group in second, for example, partition 242. Embodiments described herein enable a master host to manage (e.g., monitor and/or restart) virtual machines hosted by secondary hosts even when such a partitioning occurs.

In exemplary embodiments, each host in system 200 acting as a master host repeatedly (e.g., periodically, continuously, and/or upon request) provides status information to management server 202. The status information includes, for example, the state of one or more hosts being monitored by the master host, the software application instances being executed by such monitored hosts, the actual protection state of such software application instances, and/or events, such as the initiation of an execution or a termination of a VM. Management server 202 receives and combines the status information from any master hosts in system 200 and may provide the combined status information for presentation to a user.

VMCP 254, 256, 258, and 260 are local policies (such as VMCP 136 shown in FIG. 1) that run on hosts 206, 208, 210, and 212, respectively, and are executed by FDM 246, 248, 250, and 252, respectively. VMCP 254 manages VMs 214 and 216, VMCP 256 manages VMs 218 and 220, VMCP 258 manages VMs 22 and 224, and VMCP 260 manages VMs 226 and 228. The main functionality of each of VMCP 254, 256, 258, and 260 is to detect both transient (e.g., APD) and permanent (e.g., PDL) storage access failures on datastores (e.g., datastores 236 and 238) and terminate (e.g., an abrupt power off termination or a more ordered powered off termination) or reset virtual machines whose files are affected/impacted by the storage loss, with the termination resulting in restarting the failed virtual machines on a healthy host (e.g., a host which can access the storage devices required by the virtual machine) and reset resulting in restarting the VM Guest Operating System 134. More specifically, VMCP 254, 256, 258, and 260 each include logic that decides if and when to terminate affected virtual machines based on a current state of failure detection. VMCP 254, 256, 258, and 260 monitor datastore connectivity for powered-on virtual machines, queries for the availability of cluster capacity for virtual machine failover as required, reacts to the loss of datastore connectivity by terminating the affected virtual machines, and issues user visible events to VM manager 204.

To detect storage access failures, VMCP 254, 256, 258, and 260 may rely on a host management agent to report the accessibility of datastores, for example, datastores 236 and 238 through a specific API, while in an alternate embodiment, VMCP 254, 256, 258, and 260 intercept finer grain notifications sent by the lower system layers (e.g., device drivers) and determines accessibility from these. For example, a device driver could report that a path to a storage device (e.g., datastores 236 and 238) has failed, that all paths have failed, or that one has come back online Once a change in virtual machine's connectivity to a datastore (e.g., datastore 236 or 238) is detected, the VMCP managing the affected virtual machine determines whether it is a failure or a recovery and reacts accordingly, which may lead to the corresponding FDM terminating the affected virtual machines. Issuing the termination request may be controlled by a user policy and an availability of a potential host candidate for the virtual machine restarts. To obtain the information about the candidates, the VMCP uses a query interface which makes an FDM master (e.g., FDM 246 in partition 240 and FDM 250 in partition 242) generate a hypothetical placement recommendation for a given set of virtual machines. The FDM master takes into account the datastore connectivity on all the hosts in a cluster as if the virtual machines in question were powered off. However, if there is network partition in the cluster or the host is isolated, the termination decision may be strictly based on user policy. When a virtual machine is terminated, it is terminated in a way that triggers a restart virtual machine workflow executed by the FDM master, which is modified as described herein. Specifically, it is modified to take into account datastore accessibility when placing virtual machines and restarting them, reservations that were previously made, and integration with existing availability restart priorities. In one embodiment, the VMCP resets the impacted virtual machine if an APD failure clears after an APD timeout expires.

In one embodiment, the virtual machine termination requests are forwarded only after a user-specified timeout, and after the confirmation from a master host that there is enough capacity to restart the virtual machine(s) on a healthy host. The second condition can be relaxed if a user specified "aggressive" VMCP policy is enabled and/or there is a network partition isolating a master host from a slave host. If a master host in the same partition as a virtual machine cannot guarantee resource availability to restart the to-be-terminated virtual machine, a master in another partition might be able to restart the virtual machine. However, in one embodiment, the master in the foreign partition will not be able to deny or confirm the restartability of the virtual machine. Thus, the "aggressive" VMCP policy allows the user to be more proactive even if that may result in virtual machines being never restarted. In another embodiment, the master in the foreign partition coordinates with the master in the other partition using the SAN, a set of files stored on a common datastore, or through a secondary wireless communication mechanism.

A request received from another FDM via communication interface 108 to the FDM master to generate a hypothetical placement recommendation (i.e., reservation, may be implemented on top of the FDM placement engine module). To compute a reservation correctly, a virtual machine, which is requested for reservation, is marked powered-off and to-be-placed as well as marked powered-on and placed. Since the virtual machine is actually powered on, its resource consumption must be accounted for the host where it is running. In an alternate embodiment, the virtual machine's usage is discounted when determining the capacity available on the host so as to allow that capacity to be used by other virtual machines that are not impacted by any storage accessibility failures. In one embodiment, a set of new placement types could be added for the purpose of reservation. These types of placements can be served together with other placement requests and the virtual machines in subject are considered lower priority compared to those that request for failover or restart. However, a virtual machine cannot be requested for placement and reservation concurrently. Among the reservation requests, the ranking of virtual machine priorities follows the same rule as virtual machine placement.

Before a failover or restart is executed, a check may be made to ensure a virtual machine's datastore is still accessible on the host. If for any reason, a datastore is inaccessible or not present, the action bails out to help guarantee that FDM will not try to start virtual machines on unhealthy hosts. In another embodiment, the hypervisor 112 does the check.

When the FDM master attempts to terminate or reset a virtual machine, it might fail due to various reasons, such as the underlying host system being highly loaded. In one embodiment, such failure attempts will be retried. Further, users also have an ability to specify policies that control how many retries are made, for what type of errors, and at what frequency.

In the embodiments described herein, there are a couple of choices as to where VMCP logic can execute: global or local. Under the global policy approach, all the decisions are made by an FDM master while the slaves funnel the local state updates to the master and execute master's command. Under the local policy engine approach, the master maintains the cluster-wide component health state (based on the slaves' updates). It uses the health state for virtual machine placement. The master serves a slave's request to reserve resources for the virtual machines about to be terminated (to guarantee to some degree a subsequent successful restart). All the other logic is executed on the slave. Table 1 provides a comparison of the two approaches.

TABLE 1

| | Location of the Policy Engine | |
|---|---|---|
| | Global | Local |
| Pros | 1. Less complex tracking of global state and managing of alarms and notifications for users. | 1. Less complex policy logic, easier interaction with other policies implemented by each FDM<br>2. Better scalability with distributed computation, and the memory requirements proportional only to the local host per-VM limits. |
| Cons | 1. More complex policy logic (more states and state transitions to monitor the failure detection time-out, failure recovery, placement cancellation, etc.), which is not particularly amenable to supporting other component failures.<br>2. The memory footprint of the master may significantly increase. | 1. More complex to manage global state such as required for alarms |

In many situations, the local policy approach is selected because of its less complex implementation and better scalability. The following exemplary embodiments described herein utilize storage monitoring, failure detection and VM termination by a local VMCP policy engine.

With reference now to FIG. 3, a swimlane diagram of an exemplary method for monitoring storage connectivity failures associated with virtual machines executed on slave host 350 will now be described. As shown in FIG. 3, slave host is in communication with master host 351 via network 352, which may be, for example, network 230, SAN 232, or a combination thereof. This method may be embodied within a plurality of computer-executable instructions stored in one or more memories (e.g., memory 104 and memory 128 shown in FIG. 1), such as one or more computer-readable storage mediums. Computer storage mediums may include non-transitory storage medium such as volatile and nonvolatile random access memory, removable and non-removable mediums implemented in any method or technology for storage of information such as computer-readable instructions, data structures, program modules or other data. The instructions may be executed by one or more processors (e.g., processor 102 and processor 126 shown in FIG. 1) to perform the functions described herein.

At 302, slave host 350 identifies a failure that impacts ability of one or more of a plurality of virtual machines instantiated on slave host 350 to provide service. At 304, each of the plurality of virtual machines affected by the failure is identified by slave host 350. At 306, slave host 350 determines whether the failure is a PDL failure. If the failure is identified as a PDL failure, at 308, the impacted one or more virtual machines are terminated and master host 351 attempts to restart the terminated one more virtual machines on a healthy host at 310. In another embodiment, the termination due to a PDL may be delayed. If, however, it is determined that the failure is not a PDL failure, but is in fact an APD failure, at 312, a timeout period is initiated. For example, if a virtual machine is affected by an APD failure, the VMCP associated with the affected virtual machine moves the affected virtual machine from InitialState to MonitorComponentState, and records the "STORAGE" component's state as "APD_TIMEOUT". This entry means that the virtual machine is affected by a storage failure. In one embodiment, a length of the timeout period may be defined by a user or may be based on a default setting. The timeout period delays the slave's response to an APD to avoid reacting too quickly to a condition that could correct itself shortly.

At 314, it is determined whether the APD failure has cleared before the APD timeout period has expired. For example, if the APD failure clears within the timeout period, then impacted virtual machines are moved to a reset state at 320. However, if the timeout period expires before the APD clears (if at all), at 316, it is determined whether a partition exists (e.g., is master host 351 separated from slave host 350 by a partition). If it is determined that a partition does exist, at 318, it is determined whether a VMCP policy is "aggressive." If the VMCP policy is not aggressive, at 320, the impacted one or more virtual machines are moved to a reset state after APD clears. However, if it is determined that the VMCP policy is aggressive, at 308, slave host 350 terminates the impacted one or more virtual machines and master host 351 attempts to restart the affected virtual machines on a healthy host at 310.

At 316, if a network partition does not exist, the impacted one or more virtual machines are moved to terminate state and, at 322, slave host 350 requests master host 351 to reserve resources for the impacted one or more virtual machines. If a plurality of virtual machines is impacted by the failure, the reservation requests for the plurality of virtual machines may be batched to minimize the amount of computation performed by master host 351.

In one embodiment, slave host 350 sends a reserveResource request to master host 351: <vm, type, hostid, timestamp> ("hostid" is the ID of slave host 350) and slave host 350 starts a timer. If slave host 350 receives a result from master host 351 before the timer expires, slave host 350 determines the next step (e.g., retry or proceed with terminating the impacted one or more virtual machines). If slave host 350 does not receive the result before the timer expires, slave host 350 re-evaluates the current state (e.g., network partition or isolation, failure, virtual machine power state) and determines if it should resend the request to master host 351. If the state (e.g., failure, virtual machine power state) has changed and therefore invalidates the reservation request, slave host 350 sends a cancelReservation request to master host 351. If slave host 350 is notified that a reservation gets canceled by master host 351 (e.g., the host candidate is unavailable) and slave host 350 has not started a termination of the one or more impacted virtual machines, slave host 350 resends the request.

In one embodiment, master host 351 receives a reserveResource request <vm, type, hostid, timestamp> from slave host 350 (the request is cached to a requestMap indexed by vmId if it does not exist yet), and prior to checking for resource capacity, master host 351 checks if a reservation already exists for the one more impacted virtual machines. If a request was sent recently by the same slave host 350 (e.g., less than n seconds earlier based on the request timestamp), master host 351 returns the result immediately, otherwise, master host 351 runs a placement algorithm to find resource capacity on a candidate host in the cluster.

At 324, master host 351 calculates a resource capacity of each of the hosts in a cluster of hosts associated with slave host 350 and master host 351. At 326, it is determined whether the calculated resource capacity is sufficient for the impacted one or more virtual machines. If the calculated resource capacity is sufficient, at 308, the impacted one or more virtual machines are terminated, the reserved capacity (as well as the capacity made available by terminating the impacted one or more virtual machines) is accounted for further placement, master host 351 attempts to restart the terminated one more virtual machines on a healthy host at 310, and the virtual machine placement is recalculated after removing the previously requested reservation.

In one embodiment, the reservation for the resources has a set expiration time. In addition, a reservation can be canceled as needed. For example, a reservation may be canceled when there is a placement request for the impacted virtual machine, a user indicates that an impacted virtual machine should no longer be protected, the reservation for the impacted virtual machine expires on its own, a VMCP cancels the reservation for the impacted virtual machine when an APD failure goes away and the impacted virtual machine is still running on the original host (e.g., slave host 350), the virtual machine is found to be running on a healthy host (e.g., a user might manually remedy a virtual machine when an APD failure occurs), and/or the reserved host is unavailable or removed from the cluster.

If a recommendation is generated for a reservation request, the impacted one or more virtual machines and the recommended host(s) may be added to a reservation list by master host 351. The virtual machine entry is removed only when the reservation gets canceled upon expiration (or a limited number of other cases, as discussed above). The retry logic for a failed reservation request lives with the associated VMCP, which will determine if and when a retry should be issued. In one embodiment, if a recommendation is generated for a reservation request, master host 351 adds the result to a reservationMap indexed by vmId, <vm, type, hostCandidate>, and composes a reserveResult message, <hostid, timestamp, vm, true> and sends it to slave host 350. In one embodiment, an entry is removed from the servationMap if the reservation gets canceled or expires on its own, which also removes the corresponding entry from the requestMap. When master host 351 receives a cancelReservation request, <hostid, vm, type>, it removes the relevant entries from requestMap and reservationMap if all the parameters match.

To place a virtual machine which already has a reservation, the reservation may be canceled and the virtual machine may take precedence over the other to-be-placed virtual machines of the same restart priority. To place a virtual machine which does not have a reservation, the virtual machines with reservations may be considered in a similar way of those in pending execution, i.e., the resource reservation of such virtual machines are accounted when calculating host capacity. This may lead to the side effect that a virtual machine's resource reservation is counted twice as the virtual machine is actually running on a different host. To ameliorate, the virtual machines that cannot be placed with InsufficientResourcesFault, a resource reservation should be canceled eagerly (for example, when the host holding the reservation is removed from the cluster) and the failed placements should be re-evaluated right after a cancellation. In one embodiment, if a master (e.g., master host 351) dies, the list of reservations will be lost. In this case, the VMCP associated with the one or impacted virtual machines re-sends the reservation request to the new master if the one more impacted virtual machines have not been terminated.

In one embodiment, if a partition happens after slave host 350 sends the request to master host 351 for the reservation of resources and before slave host 350 receives any result from master host 351, rather than failing the request immediately, slave host 350 may wait until the timer it set to expire. This way, slave host 350 can tolerate transient network partitioning and keep the handling less complex. On the master side, it will not send the result if slave host 350 is partitioned, but will keep the reservation result in a queue. The reservation will be canceled when a new placement request comes in (if slave host 350 determines to terminate the impacted virtual machine or the impacted virtual machine dies) or when the reservation has expired.

A virtual machine entry may be added to requestMap when a new request comes in and before calling a placement algorithm. It is removed from requestMap when a reservation is removed or placement for the reservation request fails. A virtual machine entry is added to reservationMap when the placement succeeds, and it is removed when the reservation gets canceled, which also removes the virtual machine entry from the requestMap. Therefore, if a virtual machine entry exists in reservationMap, it also exists in requestMap (but not the other way around). A case in which a virtual machine entry exists in requestMap but not reservationMap is when there is pending request that has not yet received a result.

In one embodiment, an order of priority exists with respect to a placement of a reservation request. For example, Fault Tolerance (FT) virtual machines are given higher priority and virtual machines with disabled restart priority are not considered for placement.

With reference back to FIG. 3, if the calculated resource capacity is not sufficient, at 328, master host 351 may attempt to make sufficient capacity available within the cluster of hosts. In one embodiment, a VM manager (e.g., VM manager 204 shown in FIG. 2) is not notified if there are insufficient resources to satisfy a placement request for reservation. In this case, the impacted virtual machine is allowed to run as long as it does not crash. However, in one embodiment, a notification may be sent to the VM manager that a DRS (e.g., DRS 244 shown in FIG. 2) can take action for resource defragmentation. For example, in one embodiment, master host 351 instructs a resource scheduler (e.g., DRS 244) to defragment hosts in the cluster in attempt to make sufficient capacity. To do so, DRS may relocate virtual machines from one host in the cluster of hosts to one or more other hosts in the cluster of hosts in an attempt to create sufficient capacity for the impacted one or more virtual machines. If DRS is able to create sufficient capacity, at 308 the impacted one or more virtual machines are terminated and master host 351 attempts to restart the terminated one more virtual machines on a healthy host at 310. At 330, if DRS is unable to create sufficient capacity, prior to placing the request to reserve resources in a queue, at 332, slave host 350 first checks to ensure that the APD failure has not cleared. In the preferred embodiment, DRS retries repeatedly to defragment the cluster so the virtual machine may be restarted, while in another embodiment, the master periodically requests that another attempt be made. If the APD has cleared, the impacted one or more virtual machines are reset. In one embodiment, if the placement fails, the request is removed from the requestMap and master host 351 sends a reserveResult message, <hostid, timestamp, vm, false> to slave host 350. If the APD has not cleared, slave host 350 can re-send the request after a certain time (e.g., beginning at step 316), thereby repeating the processing of reservation request at master host 351. In another embodiment, to consider the tradeoff between virtual machine downtime and virtual machine healthiness, for transient failures (e.g., APD), a virtual machine can be kept running if there is not enough capacity in the cluster for an impacted virtual machine to failover. However, where the cluster capacity is not known, users may be enabled to make a choice (e.g., set VMCP policy to "aggressive").

In one embodiment, the method for monitoring storage connectivity failures as shown in FIG. 3 may be associated with virtual machines executed on master host 351 instead of slave host 350. In this embodiment, the steps shown in FIG. 3 as being executed on/by slave host 350 are thus executed on/by master host 351.

With reference now to FIG. 4, a swimlane diagram of an exemplary method for monitoring storage connectivity failures between paired virtual machines will now be described. This method may be embodied within a plurality of computer-executable instructions stored in one or more memories (e.g., memory 104 or memory 128 shown in FIG. 1), such as one or more computer-readable storage mediums. Computer storage mediums may include non-transitory storage medium such as volatile and nonvolatile random access memory, removable and non-removable mediums implemented in any method or technology for storage of information such as computer-readable instructions, data structures, program modules or other data. The instructions may be executed by one or more processors (e.g., processor 102 and processor 126 shown in FIG. 1) to perform the functions described herein. The methods described herein with respect to FIG. 4 apply to such paired virtual machines as the Fault Tolerance virtual machines offered by VMware, Inc.

At 402, slave host 350 identifies a failure that impacts an ability of one or more of a plurality of virtual machines instantiated on slave host 350 to provide service. At 404, slave host 350 determines that the failure impacts an ability of at least one of a primary virtual machine and a secondary virtual machine instantiated on slave host 350 and another host to provide service. At 406, it is determined whether the failure is a PDL. If the failure is a PDL, at 408 the impacted virtual machine (whether it be the primary virtual machine, the secondary virtual machine, or both) is terminated immediately without checking a health of the paired virtual machine and master host 351 attempts to restart the terminated one more virtual machines on a healthy host at 410. At 406, if the failure is not a PDL, at 412, it is determined whether both the primary virtual machine and the secondary virtual machine are impacted by the failure. In one embodiment, PeerHealthInfo APIs are used to query SMP Fault Tolerance (SMP-FT) VM's peer health. If it is determined that only one of the primary virtual machine and the secondary virtual machine are impacted by the failure, at 408 the impacted virtual machine is terminated and master host 351 attempts to restart the terminated one more virtual machines on a healthy host at 410. Thus, since the peer is healthy for single failure cases, the impacted virtual machine is moved to a TerminateState. In one embodiment, it is not required to check for capacity (i.e. request reservation) to restart the impacted virtual machine.

If it is determined at 412 that both the primary virtual machine and the secondary virtual machine are impacted by the failure, at 414, it is determined whether master host 351 is separated from slave host 350 by a partition. At 414, if it is determined that master host 351 is separated by slave host 350 by a partition, at 416 it is determined whether a VMCP policy is "aggressive." If the VMCP policy is not aggressive, at 418, the APD failure may be ignored. However, if it is determined that the VMCP policy is aggressive, at 408, slave host 350 terminates the primary virtual machine and the secondary virtual machine and master host 351 attempts to restart the primary virtual machine and the secondary virtual machine (with best effort) on a healthy host at 410.

In one embodiment, if both the primary virtual machine and the secondary virtual machine are in an APD state, the VMCP associated with the primary virtual machine will take all the necessary action and the VMCP associated with the secondary virtual machine ignores the APD state and takes no action. That is, the primary virtual machine can request reservation for itself. In one embodiment, after an APD timeout, the primary virtual machine queries master host 351 to check if both the primary virtual machine and the secondary virtual machine are in the same management network and if so, the primary virtual machine may be terminated. The VMCP of the primary virtual machine can also listen to changes of the ftState property of a virtual machine and modify the workflow. Specifically, the VCMP may be aware of the following state change: FT in needSecondary state; Disabled FT VM; FT VM in starting state; and turning off FT while APD or PDL is in progress.

At 414, if it is determined that master host 351 is not separated from slave host 350 by a partition, at 420, slave host 350 sends, to master slave 351, a request to reserve resources for the primary virtual machine. The reservation of an FT primary virtual machine is handled the same way as a non-FT virtual machine as explained above. At 422, the master host calculates a resource capacity (for at least the primary virtual machine) of each of the hosts in a cluster of hosts associated with slave host 350 and master host 351. At 424 it is determined whether the calculated resource capacity is sufficient for at least the primary virtual machine. If it is determined that the calculated resource capacity is sufficient for at least the primary virtual machine, the primary virtual machine and the secondary virtual machine are terminated at 408 and master host 451 attempts to restart the primary virtual machine and the secondary virtual machine (with best effort) on a healthy host. If, however, it is determined that the calculated resource capacity is not sufficient for at least the primary virtual machine, at 418, the APD failure is ignored. In another embodiment, a retry is made.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, as mentioned above, one or more embodiments of the present invention may also be provided with a virtualization infrastructure. While virtualization methods may assume that virtual machines present interfaces consistent with a particular hardware system, virtualization methods may also be used in conjunction with virtualizations that do not correspond directly to any particular hardware system. Virtualization systems in accordance with various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system for monitoring virtual machines, the system comprising:

a host executing a virtual machine; and a processor programmed to:

receive an indication of a storage access failure impacting an ability of the virtual machine to provide service;

determine if the storage access failure is a permanent or a transient failure; and apply a remedy comprising:

if the storage access failure is a permanent failure, terminating the virtual machine and restarting the virtual machine on a healthy host, and if the storage access failure is a transient failure, waiting for a predefined period of time, and if the transient failure does not clear within the predefined period of time, terminating the virtual machine and restarting the virtual machine on a healthy host.

2. The system of claim 1, wherein the host comprises a fault domain manager (FDM), and wherein the FDM is configured to determine if the failure is a permanent failure or a transient failure.

3. The system of claim 1, wherein the storage device is a datastore.

4. The system of claim 1, wherein the remedy further comprises resetting the virtual machine if the transient failure clears before the predefined period of time has elapsed.

5. The system of claim 1, wherein if restarting the virtual machine on the healthy host fails, the remedy further comprises retrying to restart the virtual machine on the healthy host or another healthy host.

6. The system of claim 5, wherein retrying to restart the virtual machine on the healthy host is limited to a predefined number of retries.

7. The system of claim 5, wherein retrying to restart the virtual machine on the healthy host is continued until the virtual machine is restarted on the healthy host or another healthy host.

8. The system of claim 1, wherein, if the storage access failure is a transient failure and the host and a master host, which coordinates activity of hosts and/or virtual machines, are separated by a network partition, the virtual machine is either restarted on the healthy host or is moved to a reset state after the transient failure clears, based on a predefined policy.

9. The system of claim 1, wherein:

the virtual machine is one of a pair of virtual machines; and if the storage access failure is the transient failure, the virtual machine is terminated and restarted on the healthy host if the virtual machine is the only virtual machine in the pair of virtual machines impacted by the transient failure.

10. The system of claim 9, wherein if both virtual machines in the pair of virtual machines are impacted by a transient failure and the host and a master host, which coordinates activity of hosts and/or virtual machines, are separated by a network partition, the transient failure is either ignored or both virtual machines in the pair of virtual machines are restarted on one or more healthy hosts, based on a predefined policy.

11. A method for monitoring a virtual machine executed on a host, the method comprising:

receiving an indication of a storage access failure impacting an ability of the virtual machine to provide service;

determining if the storage access failure is a permanent or a transient failure; and applying a remedy comprising:

if the storage access failure is a permanent failure, terminating the virtual machine and restarting the virtual machine on a healthy host, and if the storage access failure is a transient failure, waiting for a predefined period of time, and if the transient failure does not clear within the predefined period of time, terminating the virtual machine and restarting the virtual machine on a healthy host.

12. The method of claim 11, wherein a fault domain manager (FDM) executed on the host, determines if the failure is a permanent failure or a transient failure.

13. The method of claim 11, wherein the remedy further comprises resetting the virtual machine if the transient failure clears before a predefined period of time has elapsed.

14. The method of claim 11, wherein if restarting the virtual machine on the healthy host fails, the remedy further comprises retrying to restart the virtual machine on the healthy host or another healthy host.

15. The method of claim 14, wherein retrying to restart the virtual machine on the healthy host is limited to a predefined number of retries.

16. The method of claim 14, wherein retrying to restart the virtual machine on the healthy host is continued until the virtual machine is restarted on the healthy host or another healthy host.

17. At least one computer-readable storage medium having computer-executable instructions embodied thereon, wherein, when executed by at least one processor, the computer-executable instructions cause the at least one processor to:

receive an indication of a storage access failure impacting an ability of the virtual machine to provide service;

determine if the storage access failure is a permanent or a transient failure; and apply a remedy comprising:

if the storage access failure is a permanent failure, terminating the virtual machine and restarting the virtual machine on a healthy host, and if the storage access failure is a transient failure, waiting for a predefined period of time, and if the transient failure does not clear within the predefined period of time, terminating the virtual machine and restarting the virtual machine on a healthy host.

* * * * *